United States Patent [19]

Minear

[11] 4,121,744
[45] Oct. 24, 1978

[54] HAND HELD CADDY FOR CALCULATORS
[76] Inventor: Jerry A. Minear, 3603 Annear, Ames, Iowa 50010
[21] Appl. No.: 824,170
[22] Filed: Aug. 12, 1977
[51] Int. Cl.² .............................................. B65D 71/00
[52] U.S. Cl. .................................. 224/45 R; 24/3 R; 16/127; 235/61 A
[58] Field of Search ................. 224/45 R, 45 P, 45 Q, 224/28 R, 28 F, 28 E, 5 H, 0.5; 16/127, 110 R, DIG. 40; 63/15 R, 15.1, 15.2; 24/3 K, 3 R; 235/61 A, 61 R, 92 B, 58 M; 317/99

[56]         References Cited
        U.S. PATENT DOCUMENTS 3,080,965   3/1963   Kuchenbecker .................. 224/45 R
3,535,594   10/1970  Meyer ............................. 16/127

Primary Examiner—Trygve M. Blix
Assistant Examiner—Kenneth W. Noland
Attorney, Agent, or Firm—Zarley, McKee, Thomte, Voorhees & Sease

[57] ABSTRACT

A member of sheet material is secured either to the bottom or side edge of a calculator such that a portion having finger openings extends outwardly from the calculator to receive the fingers of the operator, and when not being used is adapted to be folded flush against the exterior surface of the calculator either along the bottom side or along the side edge and along the top surface.

12 Claims, 8 Drawing Figures

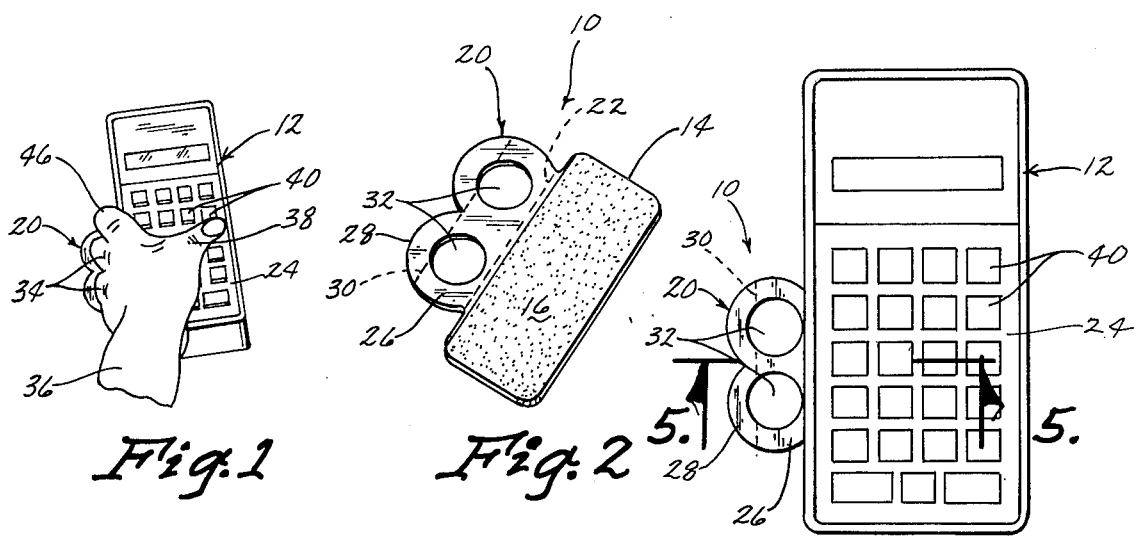
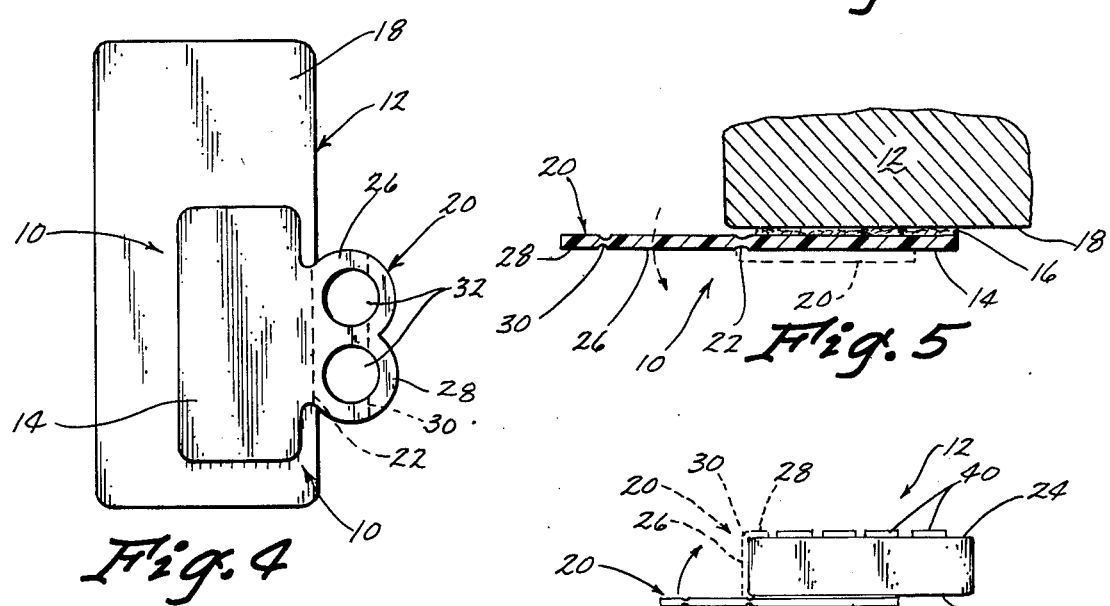
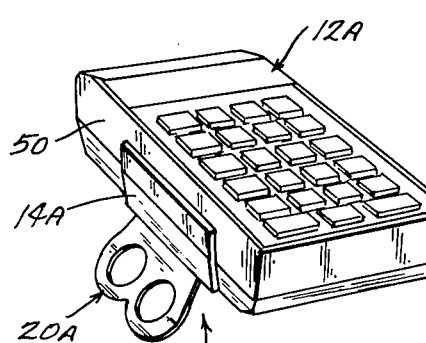
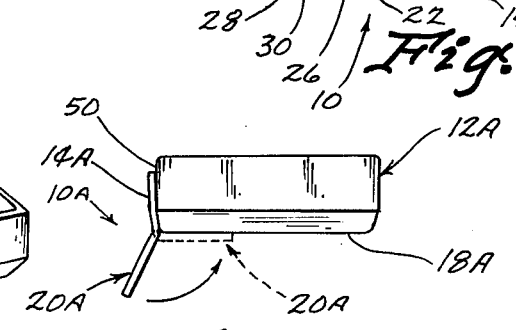

HAND HELD CADDY FOR CALCULATORS

BACKGROUND OF THE INVENTION

There are occasions when a hand held calculator is used that is inconvenient to lay the calculator down, such as when it is being used while standing and there are other occasions when it is desirable to hold a calculator in one hand while operating a writing instrument with the other hand. On these occasions, it is not convenient to operate the calculator with a single hand as it is difficult to hold it and operate it at the same time with a single hand. Accordingly, this invention is directed to a caddy for a hand held calculator.

SUMMARY OF THE INVENTION

The calculator caddy of this invention allows the operator to hold the calculator in a single hand and operate it with that same hand, while the other hand is free to operate a writing instrument or attend to other tasks. The operator's fingers extend downwardly through a pair of openings in an outwardly extending caddy member portion and then downwardly under the calculator where the end of the fingers are free to position the calculator as it is being essentially held by the end portions of the fingers extending through the openings in the caddy member. The caddy member may be secured by adhesive or the like to either the bottom side or the side edge and when the calculator is not in use and is being stored, such as in a case, the outwardly extending caddy portion may be folded downwardly along the bottom side or upwardly along the side edge and then over the top. Different calculators will have different exterior dimensions and configurations and thus the caddy member will be attached in a manner appropriate for the particular calculator being used.

DESCRIPTION OF THE DRAWINGS

FIG. 1 is a perspective view of the calculator in use employing the caddy of this invention.

FIG. 2 is a perspective view of the caddy only.

FIG. 3 is a top plan view of the caddy mounted on the bottom side of a calculator.

FIG. 4 is a bottom plan view thereof.

FIG. 5 is a cross-sectional view taken along line 5—5 in FIG. 3 showing the caddy having a portion extending laterally outwardly in the position of use.

FIG. 6 is a view similar to FIG. 5, showing the outwardly extending portion such that it is folded upwardly and over the top surface for storage.

FIG. 7 is a perspective view of an alternate embodiment of the caddy shown mounted on the side edge of a calculator.

FIG. 8 is a view similar to FIGS. 5 and 6, showing the caddy adapted to be folded along the bottom side of the calculator for storage.

DESCRIPTION OF THE PREFERRED EMBODIMENT

The caddy of this invention is referred to generally in FIG. 2 by the reference numeral 10 and is shown in FIG. 3 mounted on a calculator 12. As seen in FIG. 4, the caddy 10 is made of sheet material and includes a first portion 14 having an adhesive 16 as seen in FIG. 5 for securing it to the back side 18 of the calculator 12.

The caddy 10 includes a second portion 20 pivotally connected to the first portion 14 for folding along a fold line 22. As seen in FIG. 5, the outwardly extending portion 20 may be folded either back along the first portion 14 or as seen in FIG. 6, upwardly along the calculator side edge and over the top surface 24. The outer portion thus includes two sections 26 and 28 foldably connected together for pivotal movement about a fold line 30 thereby allowing the portion 20 to conform to the exterior shape of the calculator 12.

The caddy portion 20 includes apair of finger openings 32 to receive the two fingers 34 of the operator's hand 36 as seen in FIG. 1. The operator's thumb 38 is in position to operate the keys 40 on the top of the calculator 12. The outer ends of the fingers extending through the openings 32 extend along the bottom side 18 of the calculator 12 and allow the operator to position the calculator as desired as it is being held firmly in place on the fingers 34. The finger 46 as well as the little finger are also free to hold and position the calculator.

In FIGS. 7 and 8, a second embodiment of the caddy is shown with the fingers extending through the opening 32 along the bottom side 18 of the calculator 12 allowing the operator to position the calculator as desired, as it is being held firmly in place on fingers 34. The finger 46 as well as the little finger are also free to hold and position the calculator. In FIGS. 7 and 8, a second embodiment of the caddy invention is illustrated wherein the caddy 10A includes a first portion 14A secured to the side edge 50 of the calculator 12A, and an outwardly extending caddy portion 20A extends downwardly and outwardly to receive the operator's fingers as substantially shown in FIG. 1. When in storage, the portion 20A is free to pivot the dash line position as seen in FIG. 8 extending along the bottom side 18A of the calculator 12A.

It is seen that this notching arrangement also allows for a slightly different positioning of the finger portion 20A as it extends more downwardly normally tending to maintain itself in the plane containing the portion 14A.

Thus, it is seen that any calculator may be quickly, easily and inexpensively adapted for being hand held and operated by the attachment thereto of the caddy member of this invention. It is further appreciated that this caddy member will not in any way interfere with the storing of the calculator in its carrying case as it can be folded into mating engagement with the exterior side surfaces of the calculator.

What is claimed is:

1. A hand held caddy for calculators comprising a caddy member having a first portion adapted to be secured to a calculator and a second portion adapted to extend outwardly of the side of the calculator, said second portion having finger openings adapted to receive the operator's fingers, said first and second portions being foldably connected together for said second portion to pivot relative to said first portion, and a calculator adapted to be connected to the first portion.

2. The structure of claim 1 and said first portion includes adhesive means for connecting said first portion to a calculator.

3. The structure of claim 1 wherein said second portion includes a fold line for providing said second portion with two sections pivotally interconnected whereby said sections may be folded flat against the outer surfaces of a calculator.

4. A calculator having a hand held caddy comprising, a calculator having top, bottom and opposite side surfaces, a hand held caddy secured to said calculator and comprising a caddy member having a first portion secured to said calculator, and a second portion adapted to extend outwardly of the side of the calculator, said second portion having finger openings adapted to receive the operator's fingers, said first and second portions being foldably connected together for said second portion to pivot relative to said first portion.

5. The structure of claim 4 wherein said first portion is connected to one of the opposite side surfaces of said calculator.

6. The structure of claim 4 wherein said first portion is connected to the bottom surface of said calculator.

7. The structure of claim 6 wherein said second portion includes a fold line for providing said second portion with two sections pivotally interconnected whereby said sections may be folded flat against the adjacent side surface and the top surface of said calculator.

8. The structure of claim 7 wherein said caddy member is formed from sheet material and said finger holes number two.

9. The structure of claim 4 wherein said second portion extends downwardly and is adapted to be folded under and against the bottom surface of said calculator.

10. The structure of claim 9 wherein said caddy member is formed from sheet material and said finger holes number two.

11. A calculator having a hand held caddy comprising,
a calculator having top, bottom and opposite side surfaces and a plurality of keys on said top surface for operating the calculator,
a hand held caddy secured to said calculator and comprising a caddy member having
a first portion secured to said calculator, and
a second portion adapted to extend outwardly of the side of the calculator,
said second portion having finger openings adapted to receive the operator's fingers,
said finger openings being arranged on said second portion such that an operator's hand may be positioned to both hold the calculator with the fingers received in said openings and operate the calculator keys with another finger of the same hand.

12. The structure of claim 11 wherein said second portion includes a fold line for providing said second portion with two sections pivotally interconnected whereby said sections may be folded flat against adjacent surfaces of the calculator.

* * * * *